US005371681A

United States Patent [19]

Juds et al.

[11] Patent Number: 5,371,681

[45] Date of Patent: Dec. 6, 1994

[54] METHOD OF DISPLAYING VENDING PERIODS OF TIME

[75] Inventors: Scott Juds, Everett, Wash.; James H. Halsey, El Dorado, both of Ark.

[73] Assignee: IDX, Inc., El Dorado, Ark.

[21] Appl. No.: 167,350

[22] Filed: Dec. 15, 1993

[51] Int. Cl.[5] .............................................. G06F 15/20

[52] U.S. Cl. .................................... 364/479; 194/217; 221/2

[58] Field of Search ................... 364/479, 478, 464.01; 235/381; 194/217, 218, 219; 221/2, 9; 340/825.35; 368/8, 10, 107

[56] References Cited

U.S. PATENT DOCUMENTS

| | | | |
|---|---|---|---|
| 4,706,794 | 11/1987 | Awane et al. | 364/479 X |
| 4,864,549 | 9/1989 | Hoole | 368/10 |
| 4,907,250 | 3/1990 | Ricks | 364/479 X |
| 4,967,896 | 11/1990 | Hara | 364/479 X |

*Primary Examiner*—Joseph Ruggiero
*Attorney, Agent, or Firm*—Diller, Ramik & Wight

[57] ABSTRACT

A vending device (10) that can respond to selection of various vending commodities during the vending process by recalculating an amount of time that yet remains in the vending process as a function of proration of an original amount of compensation and new calculation parameters that are associated with the newly chosen commodity selections. This newly calculated amount of time can then be displayed.

10 Claims, 2 Drawing Sheets

METHOD OF DISPLAYING VENDING PERIODS OF TIME

FIELD OF THE INVENTION

This invention relates generally to the vending art, and in particular to the vending of commodities as a function of time.

BACKGROUND OF THE INVENTION

Vending machines of various kinds are well understood in the art. Machines that vend food items and other staple commodities are nearly ubiquitous in modern society. Typically, such machines accept legal tender, tokens, or debit cards, in exchange for which a user can select from amongst a variety of commodities. The machine then immediately provides the selected commodity to the user.

The vending commodity does not always constitute goods that are readily transportable by the user. In some instances, the vending commodity comprises a service or a combination of service and material that is intended for immediate use and/or consumption at the vending site itself. For example, many self operated car washes and automobile vacuum facilities operate in this manner. In many of these applications, the user authorizes an amount of compensation that corresponds to an amount of time during which the user wishes the vending commodity to be provided. For example, if car wash services are provided at the rate of $0.25 per minute, and the user wishes to have car washing materials and services provided for six minutes, then the user will deposit $1.50.

In such applications, it is known in the art to display the amount of time that the user has so initially authorized. It is also known in the art to update that display of time during the vending of the commodity in order to reflect an amount of time that yet remains during which the commodity can continue to be vended. This prior art approach works acceptably when used in conjunction with a single commodity having a fixed value representing the cost of providing that commodity over time. Increasingly, however, vending situations are growing more complex than this, and the prior art solutions are inadequate to the task.

For example, in some situations, once a user has initiated the vending process, the user may be presented with an opportunity to select from amongst a variety of related commodities. In one case, once a user has initiated a self-operated automobile wash by depositing a requisite amount of compensation, the user can select from amongst various vending commodities, such as various kinds of rinses, soaps, waxes, and so forth, that are vended through a common delivery mechanism. Although some of these are more costly to the owner of the vending facility, many present vending devices have no way to accommodate this. As a result, the operator must charge the same amount for a costly commodity as for a less expensive commodity. This can be unsatisfactory both for the operator and the user of the vending station.

At least one prior art device does allow different vending commodities that are provided via a common vending mechanism to be provided at differing vending rates. This prior art device, however, does not provide an indication of remaining time. As a result, many consumers are reluctant to use the device, in large part due to confusion that sets in over the varying lengths of time during which the vending commodities are provided. In extreme cases, such devices have become the subject of vandalism at the hands of consumers who act violently on such misunderstandings.

Furthermore, it is often desirable to discount one or more of the vending commodities as a marketing promotional tool to encourage customers to try a new commodity or to simply encourage new customers to try the vending commodities. The prior art has provided no convenient way in which to accommodate this need.

Accordingly, a need exists for a way to better accommodate the provision of vending commodities under such circumstances.

DESCRIPTION OF A PREFERRED EMBODIMENT

Figure 1:
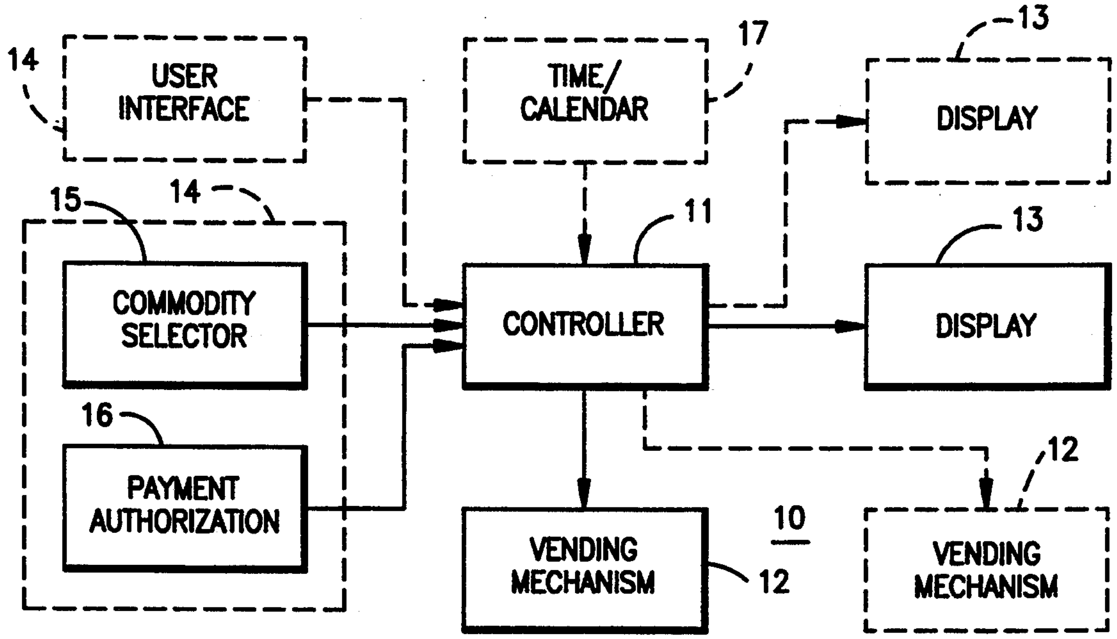
FIG. 1 comprises a block diagram of a generalized depiction of a vending apparatus configured in accordance with the invention.

With reference to FIG. 1, a vending device can be seen as depicted generally by reference numeral 10. This vending device (10) includes a controller (11), a vending mechanism (12), and a display (13). The controller (11) can be comprised of a variety of known discrete components or software programmable platforms. Further, as will be described below in more detail, the controller functions can be either centrally located or distributed between multiple platforms, as appropriate to the particular application. The vending mechanism (12) can be any known vending mechanism. In this particular embodiment, the vending mechanism (12) will be presumed to be a device having a common delivery mechanism capable of dispensing any of a variety of automobile wash commodities, such as rinse water, soap, wax, and so forth. The display (13) can be any of a known variety of displays, including liquid crystal displays, cathode ray tube displays, electroluminescent displays, and so forth.

The vending device (10) also includes a user interface (14) which includes a commodity selector (15) and a payment authorization device (16). So configured, the user authorizes compensation by interfacing with the payment authorization device (16). For example, as appropriate to the application, the user can deposit legal tender, tokens, a debit card or other debit device, or arrange for credit in any of a variety of known manners. Authorization in the appropriate amount is communicated to the controller (11). In conjunction with this activity, the user also selects a particular commodity to be vended (such as an initial rinse) by appropriate manipulation of the commodity selector (15). For example, the user may manipulate a multipole switch until an indicator on the switch points towards the desired commodity. This selection is also communicated to the controller (11). The controller (11) then enables the vending mechanism (12) to begin vending the desired commodity and causes the display (13) to display an amount of time during which the vending mechanism (12) will be so enabled. (In addition, or in the alternative, the display may also indicate how much of the original compensation remains unused.)

If desired, the controller (11) can also be coupled to a time/calendar unit (17). This unit (17) provides time of day information and/or day of the week (or month or year) information to the controller (11). This information can then be used as detailed below.

Also as may be appropriate to a particular application, and as depicted in FIG. 1, the controller (11) can be made response to a plurality of user interfaces (14), and can be configured to control a plurality of vending mechanisms (12) and displays (13), each in accordance with the teachings set forth below.

Figure 2:
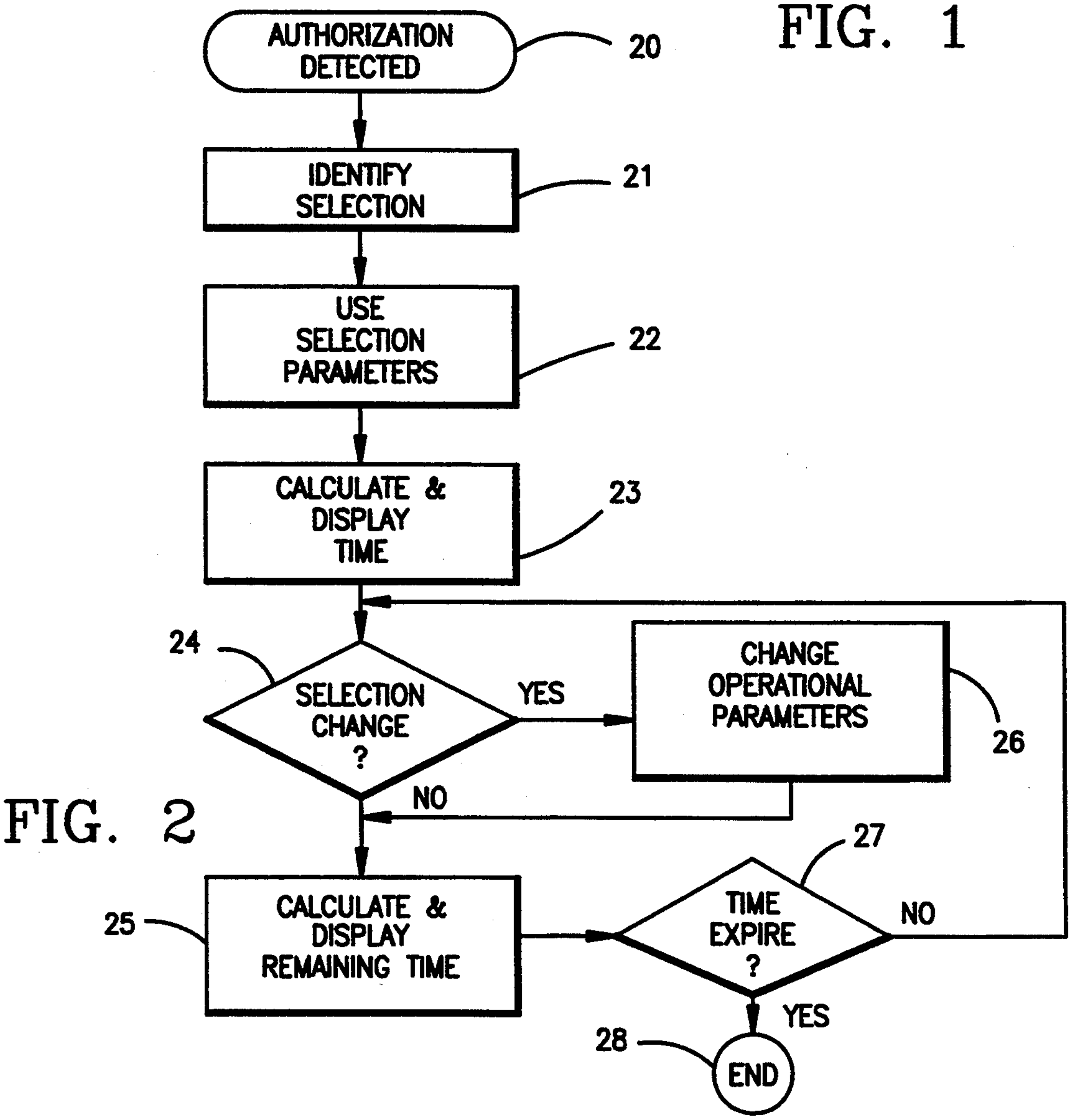
FIG. 2 comprises a flow diagram depicting general operation of a vending device in accordance with the invention.

Referring now to FIG. 2, more detail regarding the operation of the vending device (10) in accordance with the invention will be described. Upon detecting compensation authorization (20) as described above, the controller (11) identifies (21) the selection made by the user. The controller (11) then uses (22) corresponding operational parameters that have been made previously available to it and calculates and displays (23) the time remaining on the display (13). For example, for each selection that can be made, the controller (11) may have one or more parameters stored in conjunction therewith. For instance, a rinse water commodity may have a $0.25 per minute rate of dispensation associated with it, whereas a soap commodity may have a $0.50 per minute rate of vending associated therewith. The controller (11) uses the appropriate rate information in order to calculate the time that should be displayed. For example, if the user has selected rinse water, and has deposited $1.50, the controller (11) would cause six minutes to be displayed. If, however, the user had selected soap, the controller (11) would have calculated a different amount of time, and would therefore cause three minutes to be displayed. (In either case, of course, if desired, the display could also indicate the remaining amount of unused compensation, which in this case would be $1.50. As time passed and the amount of unused compensation dropped, this display could be updated to reflect the currently remaining unused amount.)

Following the above, and now during the time that the originally selected commodity is capable of being vended, the controller (11) monitors for a user initiated change (24) of the selected commodity. When no such changes have been selected, the controller (11) from time to time calculates and displays (25) the time remaining, and determines whether the vending time has expired (27). When expired, the vending process concludes (28). Otherwise, presuming that remaining time exists, the process continues as described above by again monitoring for a user initiated change of selection (24).

When such a user change is detected, the controller (11) substitutes (26) the parameters that are associated with the new selection in exchange for the parameters that correspond to the previously chosen selection. The controller (11) then calculates (25) the time remaining using this new parameter information.

If desired, the display can be updated with each new calculation of remaining time such that the remaining time will be periodically updated with respect to these selections.

So configured, the vending device (10) will generally function as illustrated in the following example. Presuming for this example that certain commodities, such as rinse water, are vended at the rate of $0.25 per minute, then upon a consumer depositing $1.50 and selecting rinse as a vending function, the device (10) will originally initiate the vending process with six minutes of allotted vending time, and this six minute figure will be displayed. The display will then be updated from time to time. For example, after two minutes, the display will indicate that four minutes of vending time yet remain as corresponds to the prorated remaining amount of compensation that has been authorized. If, at the time when four minutes remain (reflecting a $1.00 amount of prorated remaining compensation), the user selects soap instead of rinse, the controller (11) will begin using the parameters that are associated with the soap commodity. In this instance, this means that the controller (11) will begin using a $0.50 per minute rate of dispensation, as versus the $0.25rate of dispensation used for rinse water. Now, upon calculating remaining time, the controller (11) will apply the new rate of $0.50 per minute against the prorated amount of compensation that yet remains ($1.00) to conclude that two minutes of vending time now remain, and this new amount of remaining time will be displayed. The process again continues as described above, until the time either expires or the user makes yet another selection. For example, if, after one minute of dispensing soap (reflecting a prorated amount of compensation of $0.50 yet remaining), the user again switches to rinse water, the controller (11) will again substitute parameters as correspond to the selection made, recalculate time remaining using the current prorated amount of compensation and the substituted parameter, and calculate and display that two minutes of rinse time now remain, as versus one minute of soap dispensation.

So configured, this vending device (10) allows a variety of vending commodities to be provided upon initial compensation authorization and enablement, with different vending rates being applicable to the various commodities that may be selected. In this way, a user can be more fairly charged for the particular materials and services that each particular user utilizes. At the same time, a display of remaining time can be provided, which display remains accurate even though different vending rates are selected during the vending process.

The above teachings can be implemented in a variety of ways. For example, referring to FIG. 3, a first embodiment can be seen as generally depicted by reference numeral 30. In this embodiment, a coin or token acceptor (31) can be of the prior art variety that provides an output pulse in response to acceptance of each coin or token as input by a user. This output pulse is provided to both a dual timer (32) and a display (33). In this embodiment, the control function is distributed between the timer (32) and the display (33), such that the timer (32) keeps track of the duration of time during which the selected commodities may be vended, and the display (33) keeps track of the amount of time that yet remains such that this amount can be displayed. In other words, two separate time counts are maintained. The selection switch (34) allows selection, in this embodiment, of any of four different vending commodities. The selection switch (34) is ganged to a second switch (35) that provides information to both the timer (32) and the display

(33) as to which commodity has been selected, such that the amount of time can be varied as appropriate.

In this embodiment, the timer (32) has switches (36) that can be appropriately manipulated by an operator to represent different calculation parameters for different commodities. In this embodiment, up to two different parameter sets can be accommodated. (For example, a low cost parameter and a high cost parameter.) In addition, the timer can take into account both the number of seconds of vending time that can be allowed for a particular commodity, and also the number of claims that are initially required to enable the process.

So configured, both the timer (32) and the display (33) are apprised of the amount of compensation that has been authorized by the user, and both are apprised of what commodity has been selected. So configured, the timer (32) will enable the vending process for the appropriate amount of time, and the display will display the remaining amount of time, independently of one another and yet based upon the same input information. As vending selections are changed, the timer (32) and display (33) function as described above to separately revise the remaining period of vending time and the display of such time.

If desired, a data link (37) can be added to the timer (32) and the display (33) in order to allow calculation parameters to be made available, or otherwise changed from time to time, from either a local location or from a remote location. So configured, the switches of the timer (32) could be dispensed with, as well understood in the art.

Figure 3:
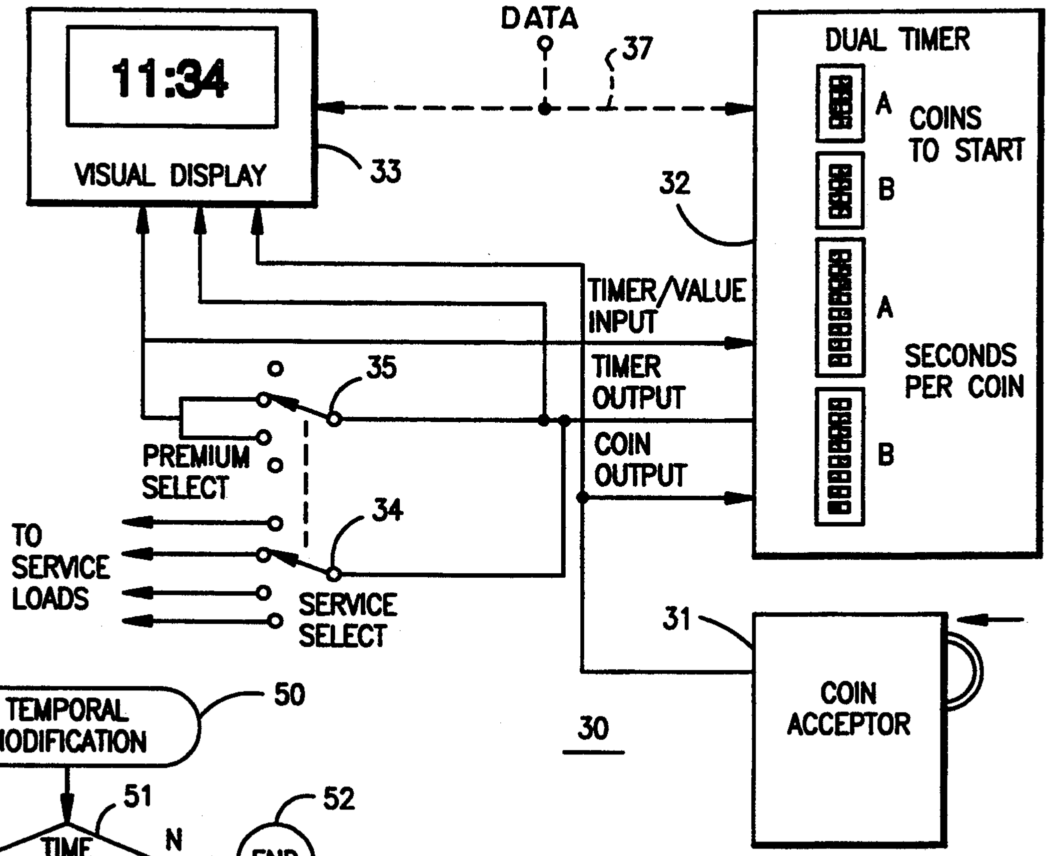
FIG. 3 comprises a block diagram of a vending apparatus configured in accordance with the invention.
Figure 4:
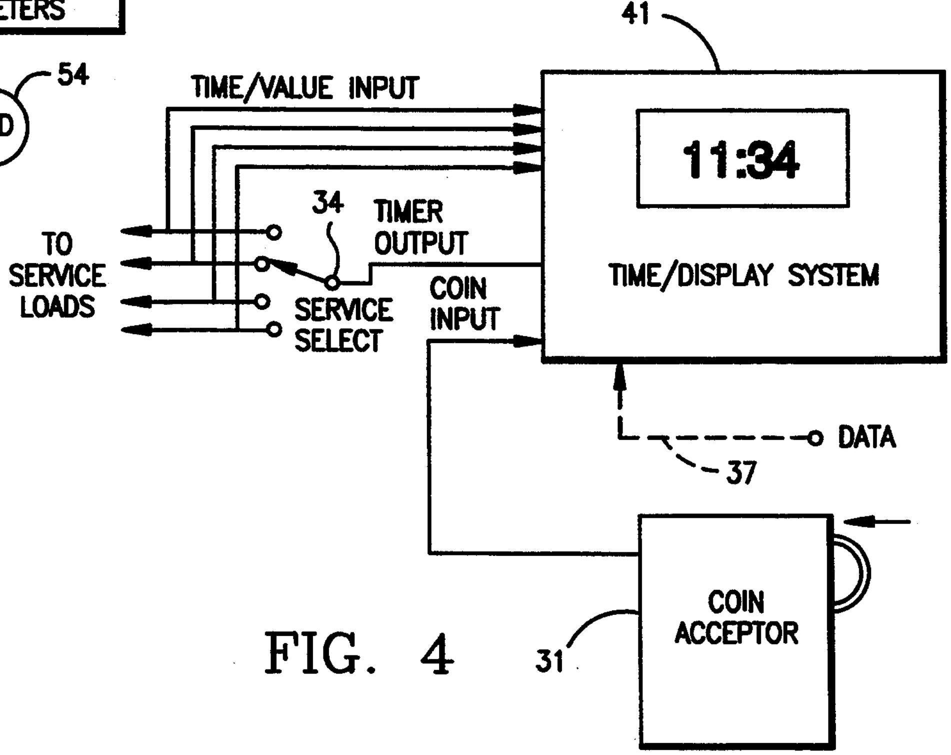
FIG. 4 comprises a block diagram of an alternative embodiment of a vending device configured in accordance with the invention.

Referring now to FIG. 4, in an alternative embodiment, the timer and display can be combined in an integrated device (41), as versus the distributed configuration described with reference to FIG. 3. Again, if desired, a data link (37) can be provided to allow the parameters used by the timer/display (41) to be changed or otherwise made locally or remotely accessible via this link.

Figure 5:
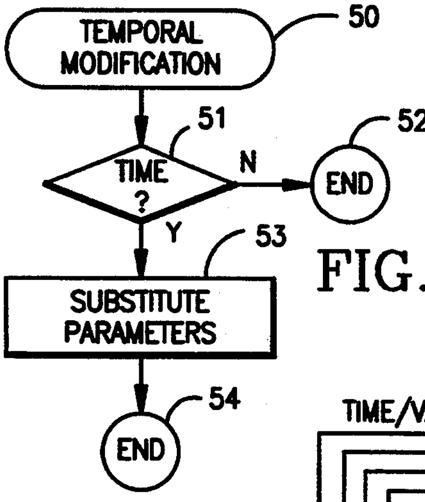
FIG. 5 comprises a flow diagram depicting an optional operation of a vending device in accordance with the invention.

As described earlier with respect to FIG. 1, the controller (11) can be coupled to a time/calendar unit (17) that provides time and/or calendar information to the controller (11). With this information, the controller (11) can supplement the teachings above by also changing one or more of the operational parameters for the vending commodities as a function of one or more other predetermined time dependent parameters, such as time of day, the day of the week, the time of the month, and so forth. As shown in FIG. 5, this modification process (50) as keyed by temporal parameters first determines whether a predetermined temporal event has occurred (51). For example, the controller (11) can be set to offer reduced vending pricing between the hours of 10:00 PM and 8:00 AM. Until the time reaches 10:00 PM, this inquiry will be negative, and the process will conclude (52). When this time arrives, however, the controller (11) will substitute (53) previously stored alternative pricing parameters for the previous pricing parameters of the corresponding vending commodity, following which this process concludes (54). So configured, the controller (11) will use the substitute parameters until they are again changed.

So configured, the vending device (10) can accommodate a variety of differently priced commodities in an integrated manner that facilitates fair pricing of the commodities involved.

What is claimed is:

1. A method of displaying periods of time during which vending commodities can be vended, comprising the steps of:

A) detecting that a user has selected a first particular vending commodity, which first particular vending commodity is vended as a function, at least in part, of a first predetermined amount of time per a first predetermined amount of compensation, and that the user has authorized a first particular amount in payment thereof;

B) automatically determining, as a function, at least in part, of the first particular amount, a first period of time during which the first particular vending commodity can be provided;

C) automatically displaying the first period of time;

D) while providing the first particular vending commodity, detecting that a user has selected a second particular vending commodity which second particular vending commodity is vended as a function, at least in part, of a second predetermined amount of time per the first predetermined amount of compensation, wherein the first and second predetermined amounts of time are different from one another;

E) automatically determining, as a function, at least in part, of a prorated amount of the first particular amount, a second period of time during which the second particular vending commodity can be provided;

F) automatically displaying the second period of time.

2. The method of claim 1, wherein the step of automatically displaying the first period of time includes the step of automatically periodically displaying a remaining period of time during which the first particular vending commodity can continue to be provided.

3. The method of claim 1, wherein the step of automatically displaying the second period of time includes the step of automatically periodically displaying a remaining period of time during which the second particular vending commodity can continue to be provided.

4. The method of claim 1, wherein:

the step of automatically displaying the first period of time includes the step of automatically periodically displaying a remaining period of time during which the first particular vending commodity can continue to be provided; and the step of automatically displaying the second period of time includes the step of automatically periodically displaying a remaining period of time during which the second particular vending commodity can continue to be provided.

5. The method of claim 1, and further including the step of:

F) periodically automatically displaying what portion of the first predetermined amount of compensation remains unused during vending of the first and second particular vending commodities.

6. The method of claim 1, and further including the step of changing, as a function of at least one predetermined parameter, at least one of the predetermined amounts of time and the first predetermined amount of compensation.

7. The method of claim 6, wherein the predetermined parameter comprises a time dependent parameter.

8. The method of claim 7, wherein the time dependent parameter comprises a time of day.

9. The method of claim 7, wherein the time dependent parameter comprises a day of the week.

10. The method of claim 1, wherein the first and second particular vending commodities are vended through use of a common delivery mechanism, such that only one of the first and second particular vending commodities can be provided at a time.

* * * * *